(12) United States Patent
Murata

(10) Patent No.: US 11,156,130 B2
(45) Date of Patent: Oct. 26, 2021

(54) GAS TURBINE COGENERATION SYSTEM AND OPERATION MODE CHANGE METHOD THEREFOR

(71) Applicant: Mitsubishi Power, Ltd., Yokohama (JP)

(72) Inventor: Shigeto Murata, Yokohama (JP)

(73) Assignee: Mitsubishi Power, Ltd., Yokohama (JP)

(*) Notice: Subject to any disclaimer, the term of this patent is extended or adjusted under 35 U.S.C. 154(b) by 228 days.

(21) Appl. No.: 16/243,766

(22) Filed: Jan. 9, 2019

(65) Prior Publication Data
US 2019/0218942 A1    Jul. 18, 2019

(30) Foreign Application Priority Data

Jan. 12, 2018   (JP) .............................. JP2018-003082

(51) Int. Cl.
*F02C 6/18*      (2006.01)
*F01K 13/02*     (2006.01)
(Continued)

(52) U.S. Cl.
CPC ............ *F01K 13/02* (2013.01); *F01K 23/101* (2013.01); *F02C 6/18* (2013.01); *F02C 7/232* (2013.01); *F02C 9/00* (2013.01); *Y02E 20/16* (2013.01)

(58) Field of Classification Search
CPC ........... F01K 23/10; F01K 23/103; F02C 6/18
See application file for complete search history.

(56) References Cited

U.S. PATENT DOCUMENTS 5,819,539 A * 10/1998 Bauver, II ............... F01K 23/10
                                                        60/646
7,861,532 B2    1/2011 Law et al.
(Continued)

FOREIGN PATENT DOCUMENTS

EP      2 672 076 A2   12/2013
JP      56-60809 A      5/1981
(Continued)

OTHER PUBLICATIONS

Extended European Search Report issued in counterpart European Application No. 19151078.3, dated Jun. 3, 2019 (six (6) pages).
(Continued)

*Primary Examiner* — Gerald L Sung
(74) *Attorney, Agent, or Firm* — Crowell & Moring LLP

(57) ABSTRACT

Reduction of operation efficiency of a GTCS at a time of changing an operation using bypass stack to an operation using HRSG is suppressed. An HRSG of the GTCS is provided with an air supply piping and a ventilation piping connected to a fuel line of a duct burner at a position upstream of a main shut-off valve and downstream of a fuel shut-off valve, an air supply shut-off valve that opens/closes the air supply piping, and a ventilation shut-off valve that opens/closes the ventilation piping, and is configured such that during an operation using a bypass stack, an inlet of the HRSG is closed to open a bypass stack, a main shut-off valve and the fuel shut-off valve are closed, and the air supply shut-off valve and the ventilation shut-off valve are always opened, and at a time of changing to an operation using HRSG, the inlet of the HRSG is opened to close the bypass stack without shutting down a GT, the main shut-off valve and the fuel shut-off valve are opened, and the air supply shut-off valve and the ventilation shut-off valve are closed.

5 Claims, 6 Drawing Sheets

(51) Int. Cl.
  *F01K 23/10* (2006.01)
  *F02C 7/232* (2006.01)
  *F02C 9/00* (2006.01)

(56) References Cited

U.S. PATENT DOCUMENTS

| | | |
|---|---|---|
| 9,175,606 B2 | 11/2015 | Bassmann et al. |
| 2001/0022080 A1 | 9/2001 | Tanaka et al. |
| 2004/0088966 A1 | 5/2004 | Tanaka |
| 2006/0272334 A1* | 12/2006 | Pranda ............... F22G 5/06 60/783 |
| 2007/0062175 A1 | 3/2007 | Yuan et al. |
| 2007/0227118 A1* | 10/2007 | Hu ..................... F23C 9/08 60/39.182 |
| 2009/0000267 A1 | 1/2009 | Law et al. |
| 2009/0025396 A1 | 1/2009 | Joshi et al. |
| 2009/0064656 A1 | 3/2009 | Oomens et al. |
| 2009/0145104 A1 | 6/2009 | Alexander et al. |
| 2011/0154802 A1 | 6/2011 | Joshi et al. |
| 2013/0104816 A1* | 5/2013 | Nenmeni ............. F01K 23/10 122/504 |
| 2017/0254270 A1 | 9/2017 | Okada et al. |

FOREIGN PATENT DOCUMENTS

| | | |
|---|---|---|
| JP | 60-206909 A | 10/1985 |
| JP | 61-8501 A | 1/1986 |
| JP | 11-022419 A | 5/1989 |
| JP | 6-42735 A | 2/1994 |
| JP | 2001-214760 A | 8/2001 |
| JP | 2004-162620 A | 6/2004 |
| JP | 2007-232262 A | 9/2007 |
| JP | 2009-8076 A | 1/2009 |
| JP | 2009-30600 A | 2/2009 |
| JP | 2009-62985 A | 3/2009 |
| JP | 2012-2125 A | 1/2012 |
| JP | 2013-92146 A | 5/2013 |
| JP | 2013-253602 A | 12/2013 |
| JP | 2016-48044 A | 4/2016 |

OTHER PUBLICATIONS

Dicampli J., "Combined Heat and Power—Gas Turbine Operational Flexibility" Power-Gen Europe, Jun. 4-6, 2013, pp. 1-11, Vienna, Austria (11 pages).
Moelling D. et al., "Startup Purge Credit Benefits Combined Cycle Operations", Tetra Engineering Group Inc., 2012, Powermag (four (4) pages).
"Boiler and Combustion Systems Hazards Code" NFPA 85, 2015, pp. 120-126, 175, and 176, (12 pages).
Japanese-language Office Action issued in Japanese Application No. 2018-003082 dated Apr. 20, 2021 with English translation (10 pages).

* cited by examiner

PRIOR ART

GAS TURBINE COGENERATION SYSTEM AND OPERATION MODE CHANGE METHOD THEREFOR

BACKGROUND OF THE INVENTION

1. Field of the Invention

The present invention relates to a gas turbine cogeneration system equipped with a heat recovery steam generator having a duct burner system and a bypass stack and an operation mode change method therefor.

2. Description of the Related Art

A GTCS (gas turbine cogeneration system) such as a GTCC (gas turbine combined cycle) is equipped with an HRSG (heat recovery steam generator) that uses an exhaust gas of a GT (gas turbine) as a heat source. In a case in which the HRSG is equipped with a bypass stack and a duct burner system, the GTCS is often operated while changing over between two operation modes of a bypass stack operation (single operation of the GT) and an operation using HRSG (combined cycle operation). At a time of an operation using bypass stack, the HRSG is isolated from the GT by a bypass damper. Thus, in a case of occurrence of leakage of a gaseous fuel in a duct burner system during the operation, the stagnation of the gaseous fuel in the HRSG possibly causes explosion due to high-temperature exhaust gas from the GT at a time of changing to an operation using HRSG. Taking this probability into consideration, the GTCS normally executes purge (cold purge) of the HRSC before restart of the GT after temporarily shut-down of the GT during change from the operation using bypass stack to the operation using HRSG. The cold purge, however, involves a shut-down process of the GT, which greatly deteriorates operation efficiency of the GTCS.

Meanwhile, it is proposed that an exhaust gas temperature of the GT be reduced to be equal to or lower than a value which is lower by 100° F. (56° C.) than a lowest auto-ignition temperature of the gaseous fuel before change from the operation using bypass stack to the operation using HRSG and the HRSG be subjected to purge (hot purge) with the GT remaining lighted off (refer to U.S. Pat. No. 7,861,532).

In addition, a technique for providing three shut-off valves in a fuel line and supplying air or inert gas to a closed region among these shut-off valves as measures against the leakage of gaseous fuel in a duct burner system of the HRSG (refer to "COMBINED HEAT AND POWER-GAS TURBINE OPERATIONAL FLEXIBILITY" (Power-Gen Europe 4-6 Jun. 2013, Messe Wien, Vienna, Austria)). According to this technique, the gaseous fuel is shut off by the closed region between the three shut-off valves the pressures of which rises by the air or the like.

With the technique of U.S. Pat. No. 7,861,532, reducing the exhaust gas temperature of the GT enables omission of a process of shut-down of the GT at a time of change to the operation using HRSG. However, no measures are taken at all against the probability of the stagnation of the gaseous fuel in the HRSG during the operation using bypass stack. Therefore, it is necessary to execute the purge itself at a time of changing to the operation using HRSG and an effect of improvement in the operation efficiency of the GTCS is limited. Furthermore, a variation in the composition of the gaseous fuel of the GT due to malfunction of a gaseous fuel base or a sudden increase in the exhaust gas temperature of the GT due to trouble of control over the exhaust gas temperature of the GT possibly causes a sudden increase in the exhaust gas temperature of the GT; thus, further study and measures are necessary for the safety of the hot purge.

Moreover, with the technique of "COMBINED HEAT AND POWER-GAS TURBINE OPERATIONAL FLEXIBILITY" (Power-Gen Europe 4-6 Jun. 2013, Messe Wien, Vienna, Austria), the probability of the leakage of the gaseous fuel into the HRSG is reduced by a method of detecting the leakage of the gaseous fuel by installing the three shut-off valves in the fuel line and monitoring the pressures between the shut-off valves and by a method of sealing the closed region between the shut-off valves by applying a pressure by the air or the like. While the philosophy of purge credit for alleviating requirements for executing the purge is proposed in "COMBINED HEAT AND POWER-GAS TURBINE OPERATIONAL FLEXIBILITY" (Power-Gen Europe 4-6 Jun. 2013, Messe Wien, Vienna, Austria), the probability of the leakage of the gaseous fuel is not completely eliminated. Furthermore, applying the technique of "COMBINED HEAT AND POWER-GAS TURBINE OPERATIONAL FLEXIBILITY" (Power-Gen Europe 4-6 Jun. 2013, Messe Wien, Vienna, Austria) during the operation using bypass stack disadvantageously complicates a system configuration.

An object of the present invention is to provide a gas turbine cogeneration system that can suppress a reduction in operation efficiency at a time of changing an operation using bypass stack to an operation using HRSG and an operation mode change method therefor.

SUMMARY OF THE INVENTION

To attain the object, a gas turbine cogeneration system according to the present invention includes: a gas turbine; a heat recovery steam generator, a bypass stack provided upstream of the heat recovery steam generator in a gas turbine exhaust gas path; a bypass damper that opens/closes the bypass stack; and a control device that controls the gas turbine, the heat recovery steam generator, and the bypass damper, in which the heat recovery steam generator includes: a duct burner; a main shut-off valve that is provided in a fuel line of the duct burner; a fuel shut-off valve that is provided upstream of the main shut-off valve in the fuel line of the duct burner; an air supply piping that joins the fuel line at a position upstream of the main shut-off valve and downstream of the fuel shut-off valve; an air supply shut-off valve that is provided in the air supply piping; a ventilation piping that is branched off from the fuel line at a position upstream of the main shut-off valve and downstream of the fuel shut-off valve; and a ventilation shut-off valve that is provided in the ventilation piping. Further, the control device is configured, during an operation using bypass stack, to close an inlet of the heat recovery steam generator to open the bypass stack, close the main shut-off valve and the fuel shut-off valve, and always open the air supply shut-off valve and the ventilation shut-off valve, and at a time of changing to an operation using heat recovery steam generator, to open the inlet of the heat recovery steam generator to close the bypass stack without shut down of the gas turbine, open the main shut-off valve and the fuel shut-off valve, and close the air supply shut-off valve and the ventilation shut-off valve.

According to the present invention, it is possible to suppress a reduction in operation efficiency of the GTCS at a time of changing from the operation using bypass stack to an operation using HRSG.

DESCRIPTION OF THE PREFERRED EMBODIMENTS

Embodiments of the present invention will be described hereinafter with reference to the drawings.

First Embodiment

—Gas Turbine Cogeneration System—

Figure 1:
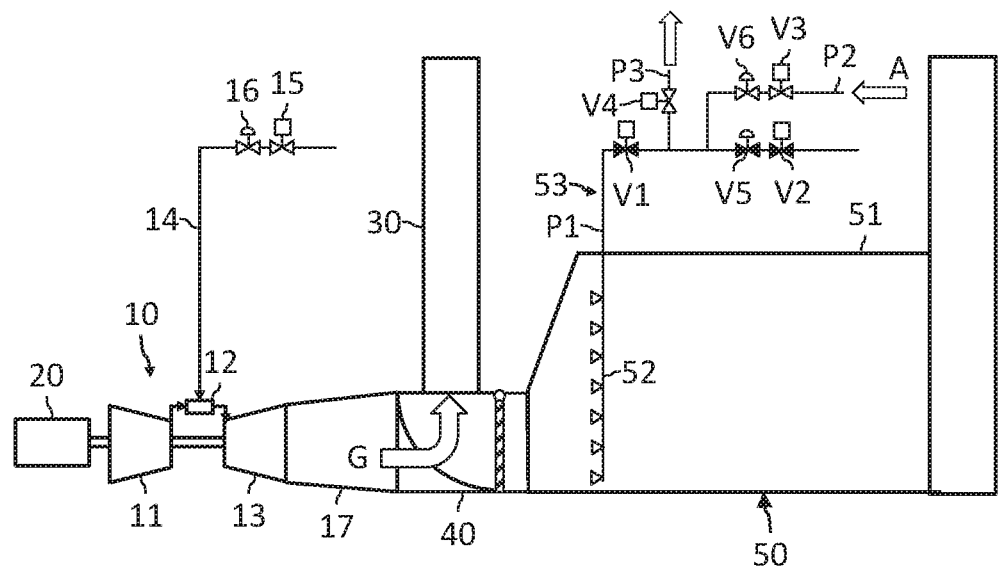
FIG. 1 is a schematic diagram representing extracted principal parts of a GTCS (during an operation using bypass stack) according to a first embodiment of the present invention.

FIG. 1 is a schematic diagram representing extracted principal parts of a gas turbine cogeneration system according to a first embodiment of the present invention. The gas turbine cogeneration system will be abbreviated as "GTCS" hereinafter, as appropriate. The GTCS depicted in FIG. 1 includes a GT (gas turbine) 10, a gas turbine generator 20, a bypass stack 30, a bypass damper 40, an HRSG (heat recovery steam generator) 50, and a control device 60.

The GT 10 includes a compressor 11, a combustor 12, and a turbine 13. The compressor 11 is an apparatus that takes in the atmosphere, compresses the atmosphere, and delivers the compressed air, and is coaxially coupled with the turbine 13. The combustor 12 is an apparatus that burns a fuel supplied from a fuel supply system (not depicted) via a fuel line 14 and the compressed air introduced from the compressor 11 and that emits a gaseous fuel. A fuel shut-off valve 15 that shuts off supply of the fuel and a fuel flow control valve 16 that controls a flow rate of the fuel are provided in the fuel line 14. The fuel shut-off valve 15 and the fuel flow control valve 16 as well as an IGV (not depicted) that controls an opening of the compressor 11 are controlled by a command signal from a control device 60. Light-off of the GT 10 means supplying a fuel to the combustor 12, and burning the fuel in the combustor 12, and generating a gaseous fuel. Shut-down of the GT 10 means stopping supply of the fuel to the combustor 12 and stopping generation of the gaseous fuel. The turbine 13 is an apparatus that is driven by the gaseous fuel generated by the combustor 12. A gas turbine generator 20 is coupled with the GT 10 via a rotary shaft and is driven by the GT 10 to generate power. While the single-shaft turbine 13 is exemplarily illustrated in the present embodiment, a two-shaft turbine having separate rotary shafts is often used. The turbine 13 is connected to an inlet side of an HRSG 50 via an exhaust gas duct 17, and exhaust gas G from the gas turbine is introduced to the HRSG 50 via the exhaust gas duct 17.

The bypass stack 30 is provided branched off from a gas turbine exhaust gas path at a position upstream of the HRSG 50 on the gas turbine exhaust gas path. The exhaust gas G introduced to the bypass stack 30 bypasses the HRSG 50 and is released to the atmosphere. The bypass damper 40 is an apparatus that opens/closes the bypass stack 30 and is driven by a command signal from the control device 60. In the present embodiment, a configuration such that the bypass damper 40 also serves as an inlet damper that opens/closes the inlet of the HRSG 50 in the gas turbine exhaust gas path is exemplarily illustrated. Specifically, the bypass damper 40 is provided at a position of an inlet of the bypass stack 30 between the exhaust gas duct 17 and the HRSG 50 in the gas turbine exhaust gas path, and selectively opens one of the bypass stack 30 and the HRSG 50. In other words, the bypass damper 40 is configured to close the inlet of the HRSG 50 when opening a flow passage of the bypass stack 30, and to open the inlet of the HRSG 50 when closing the flow passage of the bypass stack 30. It is noted, however, that the GTCS is often configured such that the bypass damper 40 is disposed in the gas turbine exhaust gas path at a position other than that between the exhaust gas duct 17 and the HRSG 50 while an inlet damper that opens/closes the inlet of the HRSG 50 is provided separately.

The HRSG 50 is a boiler that generates a steam by the exhaust gas from the GT 10, and includes a boiler main body 51, a duct burner 52, a duct burner fuel supply system 53, and the like. The boiler main body 51 is a main body of the HRSG 50 and includes a heat exchanger that transfers heat of the exhaust gas from the GT 10 to water and that generates a steam, and a stack that discharges the exhaust gas. The duct burner 52 is an apparatus that increases an amount of generated steam of the HRSG 50 by increasing a temperature of the exhaust gas from the GT 10, and provided at an appropriate position in the light of a temperature of the exhaust gas flowing within the boiler main body 51, and a flow rate and a temperature of the generated steam. The duct burner fuel supply system 53 is an apparatus that supplies the fuel to the duct burner 52. Although not depicted, an HRSG feed water system that supplies feed water to the HRSG 50, and the like are also provided. In addition, in a case in which the HRSG 50 has a function to operate solely, the HRSG 50 includes a combustion air supply duct that supplies combustion air to the duct burner 52 and a forced drain fan.

—Duct Burner Fuel Supply System—

The duct burner fuel supply system 53 includes a fuel line P1, an air supply piping P2, a ventilation piping P3, a main shut-off valve V1, a fuel shut-off valve V2, an air supply shut-off valve V3, a ventilation shut-off valve V4, a fuel flow control valve V5, an air or inert gas flow control valve V6, and the like.

The fuel line P1 is a pipe that connects a supply source (not depicted) of gaseous fuel F (FIG. 2) to the duct burner 52. The air supply piping P2 is a pipe that extends from a supply source (not depicted) of the air or inert gas (hereinafter, referred to as "gas A"). This air supply piping P2 joins the fuel line P1 at a position upstream of the main shut-off valve V1 and downstream of the fuel shut-off valve V2 and the fuel flow control valve V5 (position between the main shut-off valve V1 and both the fuel shut-off valve V2 and the fuel flow control valve V5). The ventilation piping P3 is branched off from the fuel line P1 at a position upstream of the main shut-off valve V1 and downstream of the fuel shut-off valve V2 and the fuel flow control valve V5 (position between the main shut-off valve V1 and both the fuel shut-off valve V2 and the fuel flow control valve V5), and has a tip end opened into the atmosphere. While any of the joint position of the ventilation piping P2 with the fuel line P1 and the branch position of the ventilation piping P3 off from the fuel line P1 may be on an upstream side, a case in which the branch position of the ventilation piping P3 is on a downstream side is exemplarily illustrated in the present embodiment. In addition, it is preferable that the two positions are as far from each other as possible in a range between the main shut-off valve V1 and both the fuel shut-off valve V2 and the fuel flow control valve V5. The number of each of the fuel line P1, the air supply piping P2, and the ventilation piping P3 may be one.

The main shut-off valve V1, the fuel shut-off valve V2, the air supply shut-off valve V3, and the ventilation shut-off valve V4 are electromagnetism drive type on-off valves, and the fuel flow control valve V5 and the air (inert gas) flow control valve V6 are solenoid proportional valves, each of which is driven by the command signal from the control device 60. While an example in which any of the shut-off valves is the electromagnetism drive type, the shut-off valves may be another drive type such as air drive type. The main shut-off valve V1 is provided downstream (on a side closer to the duct burner 52) of connection positions at which the air supply piping P2 and the ventilation piping P3 are connected to the fuel line P1 for the duct burner 52. The fuel shut-off valve V2 and the fuel flow control valve V5 are provided upstream of connection positions at which the main shut-off valve V1, the air supply piping P2, and the ventilation piping P3 are connected to the fuel line P1 for the duct burner 52. While any of the fuel shut-off valve V2 and the fuel flow control valve V5 is provided on an upstream side, a case of disposing the fuel shut-off valve V2 on the upstream side is exemplarily illustrated in the present embodiment. The air supply shut-off valve V3 and the air (inert gas) flow control valve V6 are provided in the air supply piping P2, while the ventilation shut-off valve V4 is provided in the ventilation piping P3. While any of the air supply shut-off valve V3 and the air (inert gas) flow control valve V6 may be provided on an upstream side, a case of disposing the air supply shut-off valve V3 on the upstream side is exemplarily illustrated in the present embodiment.

—Control Device—

Figure 3:
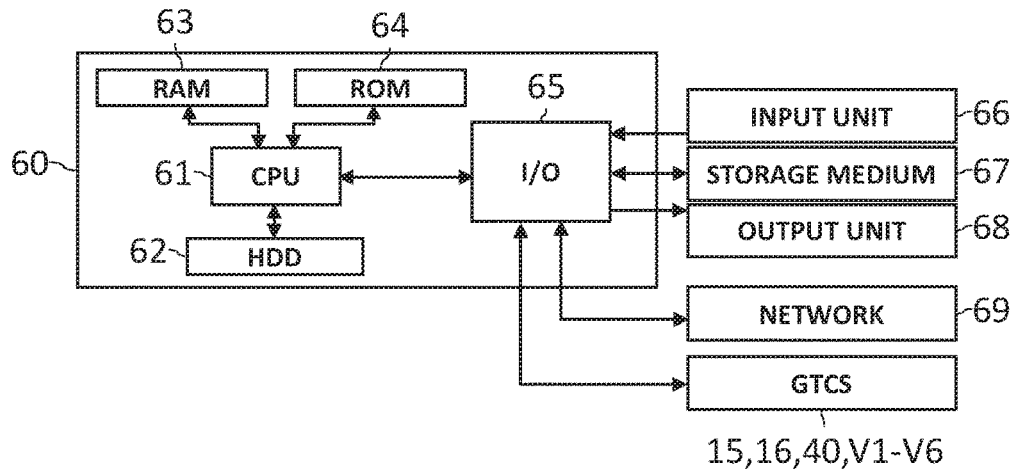
FIG. 3 is a conceptual diagram of a control device provided in the GTCS of FIG. 1.

FIG. 3 is a conceptual diagram of the control device. The control device 60 of FIG. 3 is, for example, a computer that is installed in a GTCS control room, and has a function to control the GT 10, the HRSG 50, and the bypass damper 40. This control device 60 includes a CPU 61, an HDD 62, a RAM 63, a ROM (for example, EPROM) 64, and I/O port 65.

An input unit 66, a recording medium 67, an output unit 68, a network 69, as well as sections of the GTCS to be commanded and instruments are connected to the I/O port 65 as appropriate. The sections to be commanded include the fuel shut-off valve 15, the fuel flow control valve 16, the IGV (not depicted), the main shut-off valve V1, the fuel shut-off valve V2, the air supply shut-off valve V3, the ventilation shut-off valve V4, the fuel flow control valve V5, the air (inert gas) flow control valve V6, and the like. As the input unit 66, a keyboard, a mouse, a touch panel, and the like can be typically used. In a case in which the output unit 68 is a touch panel, the output unit 68 often functions as the input unit 66. As the recording medium 67, any of various kinds of recording mediums such as a magnetic tape, a magnetic disk, an optical disk, a magneto-optical disk, and a semiconductor memory is applicable. As the output unit 68, a display device such as a monitor or a printer is applicable. A device such as a loudspeaker that outputs sound is applicable as the output unit 68. In addition, the control device 60 may be configured integrally with the input unit 66 and the output unit 68, and a form of the control device 60 is not limited but may be a desktop type, a notebook type, a tablet type, or the like. The network 69 includes not only the Internet but also a LAN and the like, and the control device 60 is connectable to another terminal, a database, a server, or the like via the network 69.

Various kinds of programs including a GTCS operation program and the like are stored in the ROM 64, and these programs are read by the CPU 61 from the ROM 64, loaded to, for example, the RAM 63, and executed. The operation program can be input from the recording medium 67 or the network 69 via the I/O port 65 and stored in the ROM 64. The operation program can be executed by being read by the CPU 61 from the recording medium 67 or the network 69 via the I/O port 65 and directly loaded to the RAM 63 without being stored in the ROM 64. Data and the like obtained by operations are stored in one or more memories out of the HDD 62, the ROM 64, the RAM 63, and the recording medium 67, and output to the output unit 68 by operating the input unit 66. In the present specification, at least one of the RAM 63, the ROM 64, the HDD 62, the recording medium 67, a storage device connected via the network 69, and the like will be denoted simply as "memory," hereinafter.

—Operation—

Figure 4:
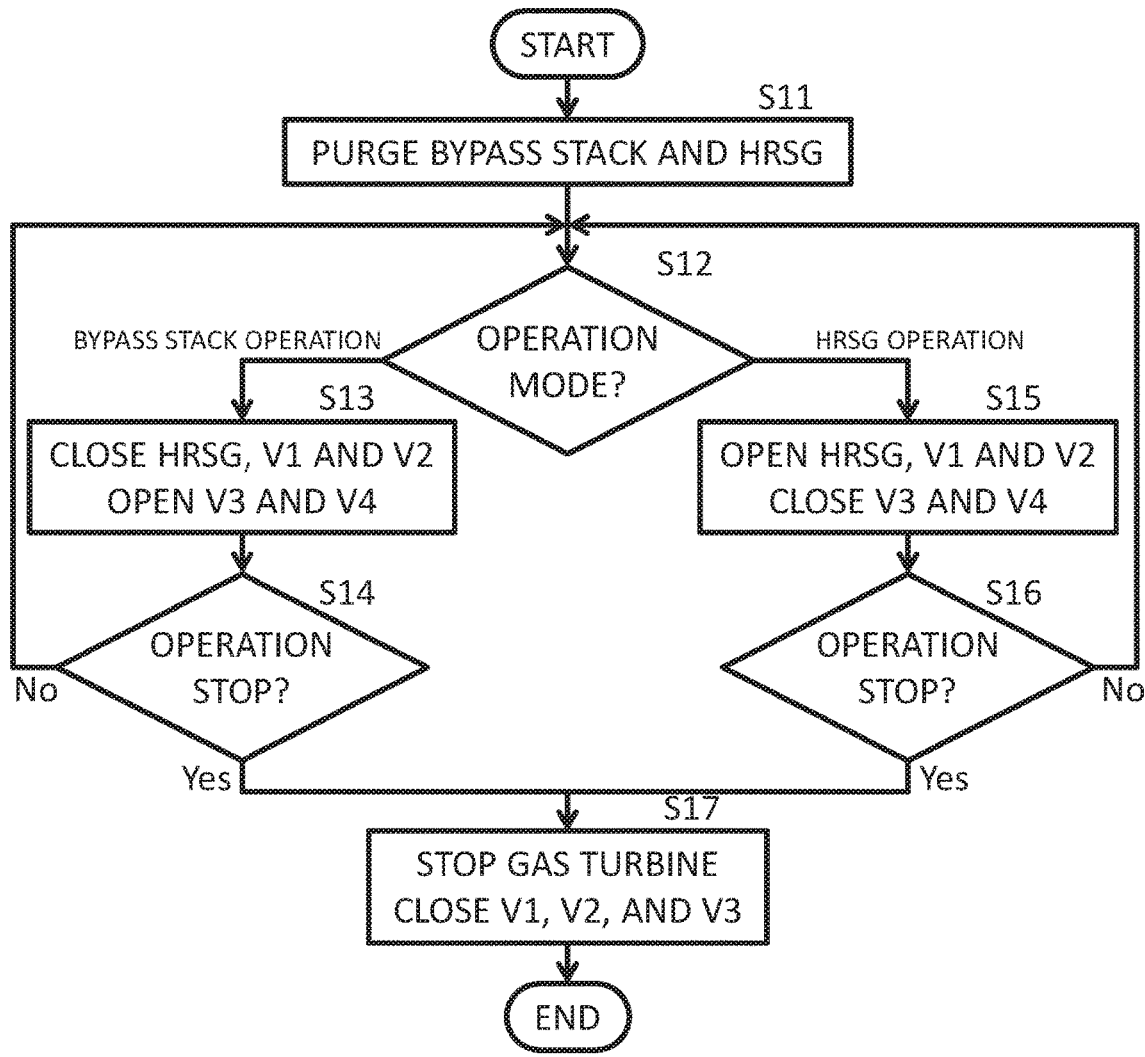
FIG. 4 is a flowchart representing principal parts of procedures for operation mode change of the GTCS executed by the control device of FIG. 3 in accordance with an operation program.

FIG. 4 is a flowchart representing principal parts of procedures for operation mode change of the GTCS executed by the control device in accordance with the operation program. The operation program includes a procedure for starting a plant (S11), a procedure for determining an operation mode (S12), a procedure for executing an operation using bypass stack (S13), a procedure for executing an operation using HRSG (S15), procedures for determining whether to stop the operation (S14 and S16), and a procedure for stopping the operation (S17). The control device 60 repeatedly executes the procedures of FIG. 14 in a cycle of, for example, predetermined time (for example, one second).

S11 and S12

When an instruction to start the GTCS is input from the input unit 66, the control device 60 loads the operation program to the RAM 63 and starts the procedures of FIG. 4. First, for starting the GTCS, the control device 60 changes over the bypass damper 40 before light-off of the GT 10 to perform sequential purge, and purges an exhaust system of the boiler main body 51 of the HRSG 50 and the bypass stack 30 (S11). Upon completion of purge, the control device 60 determines an instructed operation mode by a signal input from the input unit 66 (S12). It is assumed herein that two types of operation modes, that is, an operation using bypass stack (GT simple cycle operation) and an operation using HRSG (combined cycle operation) are prepared and that the control device 60 determines which of these operations is the instructed operation mode.

S12 to S14

The procedures S12 to S14 are procedures for executing the operation using bypass stack. In a case in which the operation mode is the operation using bypass stack, the control device 60 repeatedly executes the procedures S12 to S14 until an instruction of operation stop or change of the operation mode is issued. Until this instruction, the control device 60 issues a command to the bypass damper 40 to close the inlet of the HRSG 50. At the same time, the control device 60 opens the bypass stack 30, and then closes the main shut-off valve V1 and the fuel shut-off valve V2 and opens the air supply shut-off valve V3 and the ventilation shut-off valve V4. It is preferable that timing of opening/closing each shut-off valve is in an order of the timing of closing the fuel shut-off valve V2, that of opening the air supply shut-off valve V3, that of closing the main shut-off valve V1, and that of opening the ventilation shut-off valve V4. This is because the gaseous fuel F can be effectively discharged even if the gaseous fuel F stagnates in the fuel line P1 from the branch position of the ventilation piping P3 to the duct burner 52. While an opening of the fuel flow control valve V5 may be an arbitrary opening, it is assumed, for example, that a command of a minimum opening is issued. It is assumed, for example, that a command of a maximum opening is issued as for an opening of the air (inert gas) flow control valve V6. In addition, at a time of startup, the control device 60 starts the GT 10 in accordance with a startup program of the GT 10 and lights off the combustor 12. During the operation using bypass stack, the opened/closed states of the shut-off valves are kept as described above, the gas A is always supplied from the air supply piping P2 to a region between the main shut-off valve V1 and the fuel shut-off valve V2 in the fuel line P1, and this gas A is released into the atmosphere via the ventilation piping P3. It is noted that FIG. 1 represents the opened/closed states of the shut-off valves during the operation using bypass stack. Open shut-off valves are in the opened states while the shut-off valves filled in with black are in the closed states.

During the operation using bypass stack, the air compressed by the compressor 11 is introduced to the combustor 12, and the air as well as the fuel supplied from the fuel line 14 is burned in the GT 10. The GT 10 rotates by combustion gas generated by this process and the gas turbine generator 20 generates power. The exhaust gas G from the GT 10 is subjected to a purification treatment as needed and then released into the atmosphere via the bypass stack 30.

In a case of starting the operation using bypass stack by changing the operation mode from the operation using HRSG, there is no probability that the gaseous fuel F in the duct burner fuel supply system 53 during the operation using HRSG stagnates in the bypass stack 30. Therefore, it is unnecessary to purge the bypass stack 30 at a time of changing from the operation using HRSG to the operation using bypass stack.

S12, S15, and S16

Figure 2:
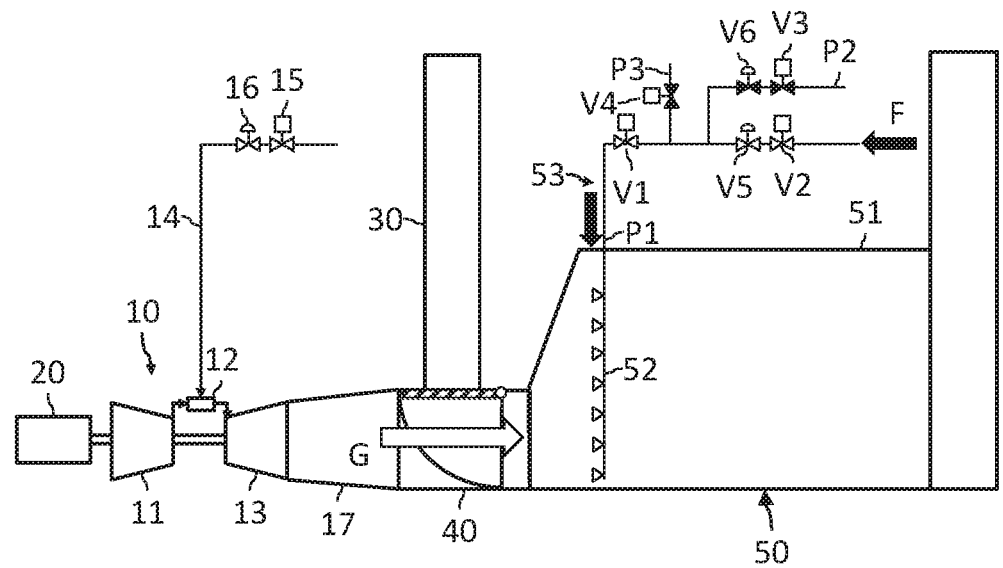
FIG. 2 is a schematic diagram representing extracted principal parts of the GTCS (during an operation using HRSG) according to the first embodiment of the present invention.

The procedures S12, S15, and S16 are procedures for executing the operation using HRSG. In a case in which the operation mode is the operation using HRSG, the control device 60 repeatedly executes the procedures S12, S15, and S16 until an instruction of the operation stop or the change of the operation mode is issued. Until this instruction, the control device 60 issues a command to the bypass damper 40 to close the bypass stack 30. At the same time, the control device 60 opens the inlet of the HRSG 50, and then opens the main shut-off valve V1 and the fuel shut-off valve V2 and closes the air supply shut-off valve V3 and the ventilation shut-off valve V4. While an opening of the air (inert gas) flow control valve V6 may be an arbitrary opening, it is assumed, for example, that a command of a minimum opening is issued. The opening of the fuel flow control valve V5 is controlled as appropriate in accordance with a GTCS control program. In addition, at a time of startup, the control device 60 starts the GT 10 in accordance with a startup program of the GT 10 and lights off the combustor 12. FIG. 2 represents the opened/closed states of the shut-off valves during the operation using HRSG. Similarly to FIG. 1, open shut-off valves are in the opened states while the shut-off valves filled in with black are in the closed states.

During the operation using HRSG, the air compressed by the compressor 11 is introduced to the combustor 12, and the compressed air as well as the fuel supplied from the fuel line 14 is burned in the GT 10. The GT 10 rotates by combustion gas generated by this process and the gas turbine generator 20 generates power. The exhaust gas G from the GT 10 is introduced to the HRSG 50, and the HRSG 50 generates a steam using this exhaust gas G as a heat source. The exhaust gas G completed with a task as the heat source in the HRSG 50 is subjected to a purification treatment as needed and then released into the atmosphere via a stack of the HRSG 50. In addition, the steam generated in the HRSG 50 is supplied, for example, as a process steam to a corresponding plant facility or the like, or supplied as a working medium to a steam turbine (not depicted) in a case in which the GTCS is a combined cycle type. The steam completed with the task at a supply destination is, for example, condensed by a condenser (not depicted) and supplied again to the HRSG 50 as a steam source.

In a case of starting the operation using HRSG by changing the operation mode from the operation using bypass stack, the air supply piping P2 and the ventilation piping P3 are opened and sections in the middle of the fuel line P are always purged during the operation using bypass stack. Therefore, even if leakage occurs in the fuel shut-off valve V2, the leaking fuel as well as the gas A supplied from the air supply piping P2 is forced to be released into the atmosphere via the ventilation piping P3. In this way, the fuel line P1 is always purged during the operation using bypass stack; thus, the stagnation of the gaseous fuel F in the boiler main body 51 and the like hardly occurs during the operation using bypass stack. Therefore, at the time of changing the operation using bypass stack to the operation using HRSG, it is unnecessary to temporarily shut down the GT 10 or to reduce an exhaust gas temperature of the GT 10. However, in a case in which it is required to temporarily shut down the GT 10 or to reduce the exhaust gas temperature by a plant operation standard or a plant operation plan, the GT 10 may be temporarily shut down or the exhaust gas temperature of the GT 10 may be reduced at the time of changing the operation using bypass stack to the operation using HRSG.

S17

During the operation, the control device 60 determines whether there is an instruction to stop the operation from the input unit 66 (S14 and S16). The control device 60 returns to the procedure S12 if there is no instruction to stop the operation, and goes to the procedure S17 if there is an instruction to stop the operation. In the procedure S17, the control device 60 stops supplying the fuel to the GT 50 and closes the main shut-off valve V1, the fuel shut-off valve V2, and the air supply shut-off valve V3 of the HRSG 50.

While a case of automatically controlling the GTCS by the control device 60 in accordance with the operation program has been described, there is a method of, for example, changing the operation mode as described above by manually operating each valve via the input unit 66. In a case of supposing that each valve is manually operated at the time of changing the operation mode over between the operation using bypass stack and the operation using HRSG, the operation program described above is not always required.

—Comparisons—

Figure 8:
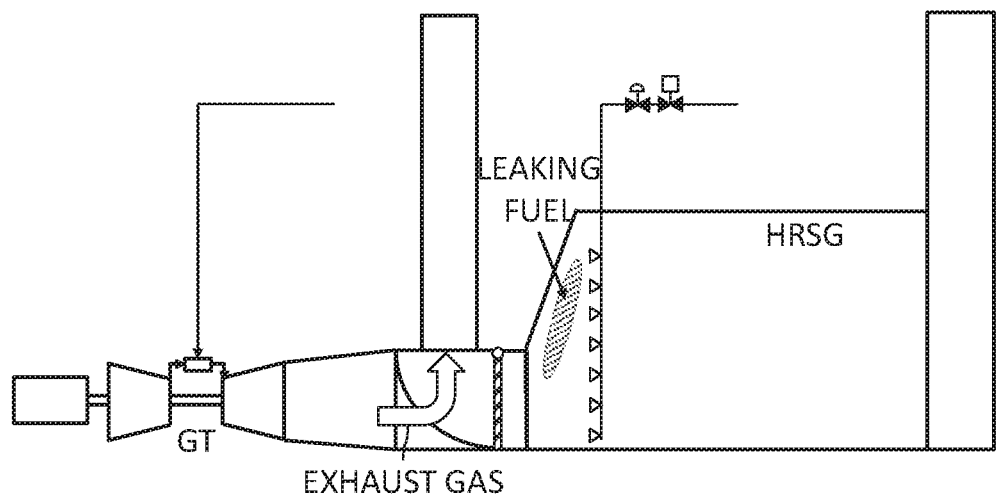
FIG. 8 is a schematic diagram representing extracted principal parts of a GTCS according to a first comparison.

FIG. 8 is a schematic diagram representing extracted principal parts of a GTCS according to a first comparison. FIG. 8 represents a state during the operation using bypass stack. The opened/closed states of the valves are expressed similarly to those in the drawings already described. An air supply piping and a ventilation piping are not provided in a fuel system of a duct burner in an HRSG of a GTCS depicted in FIG. 8. At the time of changing the operation using bypass stack to the operation using HRSG in such a GTCS, an exhaust system of the HRSG is normally purged (subjected to cold purge) upon shut-down of the GT. However, the cold purge involving the shut-down of the GT reduces operation efficiency of the GTCS. To address the problem, therefore, it is advocated to execute purging (hot purge) of the exhaust system of the HRSG without shut-down of the GT. The hot purge is executed on condition that the exhaust gas temperature of the GT is reduced to be equal to or lower than a temperature T (=T0−100° F.=T0−56° C.) lower by 100° F. (56° C.) than a lowest auto-ignition temperature T0 of the gaseous fuel of the HRSG. According to this method, even in a case in which the stagnation of the gaseous fuel slightly occurs in the exhaust system of the HRSG as represented by hatching in FIG. 8 during the operation using bypass stack, the gaseous fuel stagnating in the exhaust system of the HRSG can be purged with low-temperature exhaust gas at a time of moving to the operation using HRSG. Since the operation mode moves from the operation using bypass stack to the operation using HRSG with the GT kept lighted off, it is expected to improve the operation efficiency of the GTCS.

However, this method is not at all capable of handling the probability of the stagnation of the gaseous fuel in the exhaust gas system of the HRSG due to leakage from a fuel system of a duct burner during the operation using bypass stack. Although the shut-down of the GT is not executed, a process of reducing the exhaust gas temperature of the GT, a process of purging the exhaust system of the HRSG with low-temperature exhaust gas, and a process of increasing again the exhaust gas temperature of the GT are required; thus, the effect of improving the operation efficiency of the GTCS is limited.

Figure 9:
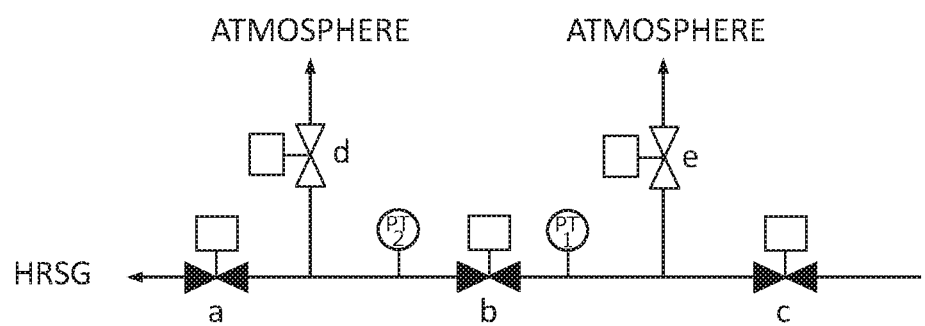
FIG. 9 is a schematic diagram representing extracted principal parts of a fuel system according to a second comparison.

FIG. 9 is a schematic diagram representing extracted principal parts of a fuel system according to a second comparison. The opened/closed states of the valves are expressed similarly to those in the drawings already described. A fuel system depicted in FIG. 9 supplies gaseous fuel to a duct burner of an HRSG and three shut-off valves a to c are installed on a fuel line. In addition, a ventilation piping is branched off from the fuel line between the shut-off valves a and b, a ventilation piping is branched off therefrom between the shut-off valves b and c, and ventilation valves d and e are installed in the ventilation pipings, respectively. Pressure gauges PT2 and PT1 are installed between the shut-off valves a and b and between the shut-off valves b and c in the fuel line, respectively. In this comparison, the fuel system is configured in this way for the purpose of carrying out a leakage test on the shut-off valves.

In this comparison, in a case of stopping supply of the gaseous fuel to the duct burner, the shut-off valves a to c are closed and the ventilation valves d and e are opened. In a case of carrying out a test to determine whether there is leakage of the gaseous fuel during this time, the ventilation valves d and e are closed and then the shut-off valve c is opened. If a measurement value of the pressure gauge PT2 is increased, this indicates that leakage occurs in the shut-off valve b.

If this comparison is applied, it is possible to confirm whether leakage of the gaseous fuel in the fuel system of the duct burner is present during the operation using bypass stack; however, the numbers of shut-off valves, ventilation pipings and the ventilation valves increase. In addition, complicated valve operation described above is necessary whenever the gaseous fuel leakage test is carried out; thus, leakage of the gaseous fuel cannot be detected in real time. Furthermore, during stop of supply of the fuel to the duct burner, the shut-off valves a to c are closed. Owing to this, in a case of occurrence of leakage in the shut-off valves a to c, the leaking fuel is not positively discharged via the ventilation piping. Therefore, even with a combination of the first comparison with the second comparison, it is impossible to omit the purge of the exhaust system of the HRSG at the time of moving the operation using bypass stack to the operation using HRSG. In a case of applying the second comparison, it is proposed in "COMBINED HEAT AND POWER-GAS TURBINE OPERATIONAL FLEXIBILITY" (Power-Gen Europe 4-6 Jun. 2013, Messe Wien, Vienna, Austria) that the philosophy of "purge credit" be introduced to make it unnecessary to execute purging for a certain period (eight days). However, the proposal is not sufficient as described above.

Figure 10:
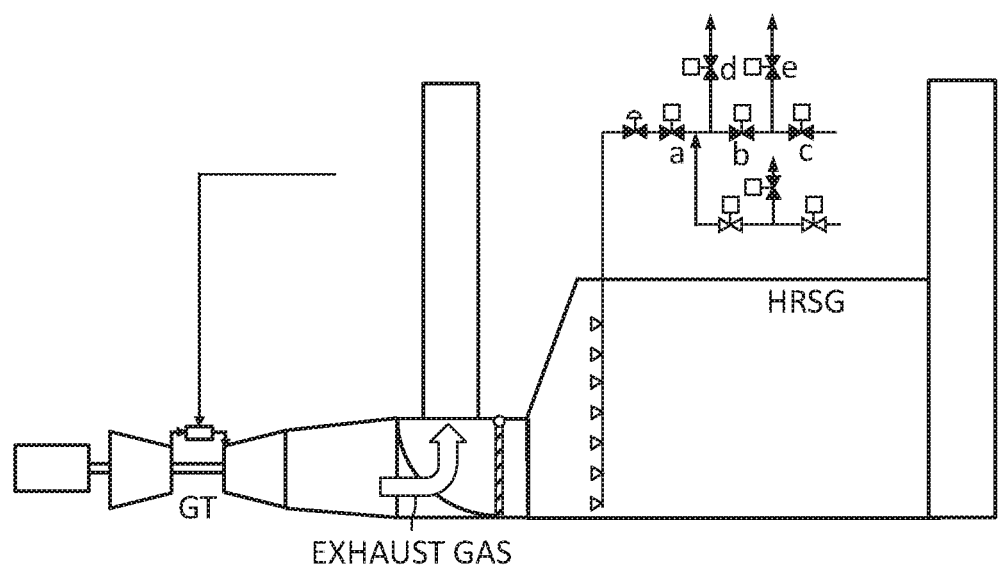
FIG. 10 is a schematic diagram representing extracted principal parts of a GTCS according to a third comparison.

FIG. 10 is a schematic diagram representing extracted principal parts of a GTCS according to a third comparison. In FIG. 10, the pressure gauges PT1 and PT2 of FIG. 9 are omitted. Similarly to FIG. 1, open shut-off valves are in the opened states while the shut-off valves filled in with black are in the closed states. An improved fuel system of the fuel system in the second comparison is applied as a fuel system of a duct burner in an HRSG of a GTCS of FIG. 10. The fuel system in the third comparison is based on the fuel system in the second comparison and configured to add an air pressurization system in order to improve a gaseous fuel shut-off performance. Specifically, in a case of stopping supply of the gaseous fuel to the duct burner, the shut-off valves a to c and the ventilation valves d and e are closed, a region closed by these valves is pressurized with the air, and the gaseous fuel is sealed. While procedures for the leak test similar to those in the second comparison are executed, the gaseous fuel shut-off performance is improved by a sealing effect by air pressurization multiplied by the three shut-off valves a to c.

According to the third comparison, it is expected to improve the gaseous fuel shut-off performance in the fuel system of the duct burner during the operation using bypass stack. Therefore, it is proposed in "COMBINED HEAT AND POWER-GAS TURBINE OPERATIONAL FLEXIBILITY" (Power-Gen Europe 4-6 Jun. 2013, Messe Wien, Vienna, Austria) that the philosophy of "purge credit" be introduced, closing of the shut-off valves and the pressure be continuously monitored, and purge be unnecessary to execute without time restriction in a case in which it can be determined that a sealing performance is ensured. However, the third comparison has a disadvantage in that many shut-off valves are required to complicate a system configuration.

—Effect—

According to the present embodiment, by contrast, the number of shut-off valves is small and a system configuration is simple. In addition, during the operation using bypass stack, the air is always supplied to the fuel line P1 via the air supply piping P2 and the ventilation piping P3. Thus, even if leakage of the gaseous fuel F occurs in the fuel shut-off valve V2, then the leaking gaseous fuel F as well as the gas A supplied from the air supply piping P2 is instantly discharged into the atmosphere through the ventilation piping P3, and "intrinsic safety" is ensured. This makes it unnecessary to purge the exhaust system of the HRSG 50 at the time of moving from the operation using bypass stack to the operation using HRSG. Therefore, it is necessary to simply operate the bypass damper 40 to close the bypass stack 30, open the inlet of the HRSG 50, and start supply of the fuel to the duct burner 52 as needed without changing the operation state of the GT 10; thus, it is expected to produce an effect of considerably improving the operation efficiency of the GTCS. The GTCS is free from an influence of a sudden variation in the exhaust gas temperature due to a change in the composition of the fuel of the GT 10 or the malfunction of the exhaust gas temperature control. It is, therefore, possible to suppress reduction in the operation efficiency of the GTCS at the time of changing the operation using bypass stack to the operation using HRSG.

Moreover, while the numbers of shut-off valves and pipings increase for the leak test in the second and third comparisons, in the present embodiment, the numbers of valves and pipings are held down and the operating the valves to be opened/closed can be performed through the simple procedures as described with reference to FIG. 4.

Second Embodiment

Figure 5:
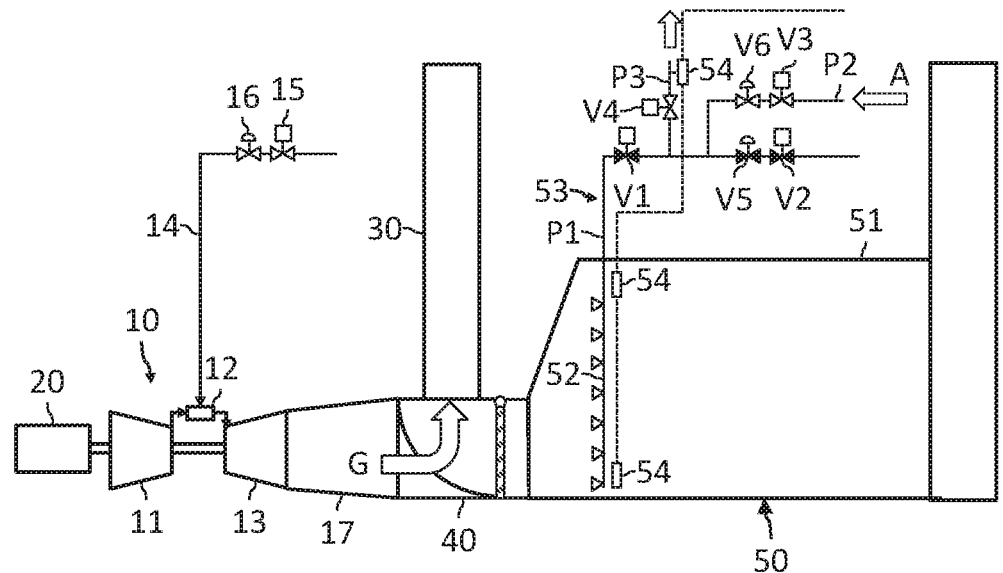
FIG. 5 is a schematic diagram representing extracted principal parts of a GTCS (during an operation using bypass stack) according to a second embodiment of the present invention.

FIG. 5 is a schematic diagram representing extracted principal parts of a gas turbine cogeneration system according to a second embodiment of the present invention. FIG. 5 represents a state during the operation using bypass stack. In FIG. 5, same or corresponding elements as or to those in the first embodiment are denoted by the same reference characters as those in the drawings of the first embodiment. The opened/closed states of the valves are expressed similarly to those in the drawings already described. The present embodiment differs from the first embodiment in that a function to monitor the gaseous fuel F is added to the HRSG 50.

Specifically, at least one gas detector (sensor) 54 is added to the HRSG 50 in the GTCS according to the present embodiment. While an installation location of the gas detector 54 and the number of installed gas detectors 54 depend on a type, a capacity, a structure, and the like of the HRSG 50, the gas detector 54 is provided at least in the exhaust system (for example, near the duct burner 52) in the boiler main body 51 of the HRSG 50. The number of installed gas detectors 54 is at least one. However, it is preferable to install the gas detectors 54 in upper and lower portions within the boiler main body 51 as depicted in FIG. 5 since there are cases in which components prone to stagnate on a lower side of the boiler main body 51 and components prone to stagnate on an upper side thereof are mixed in the gaseous fuel F. In addition, a case in which the gas detector 54 is also installed in the ventilation piping P3 is exemplarily illustrated in the present embodiment. The gas detector 54 may be installed in the fuel line P1 (for example, between the main shut-off valve V1 and the fuel shut-off valve V2).

Figure 6:
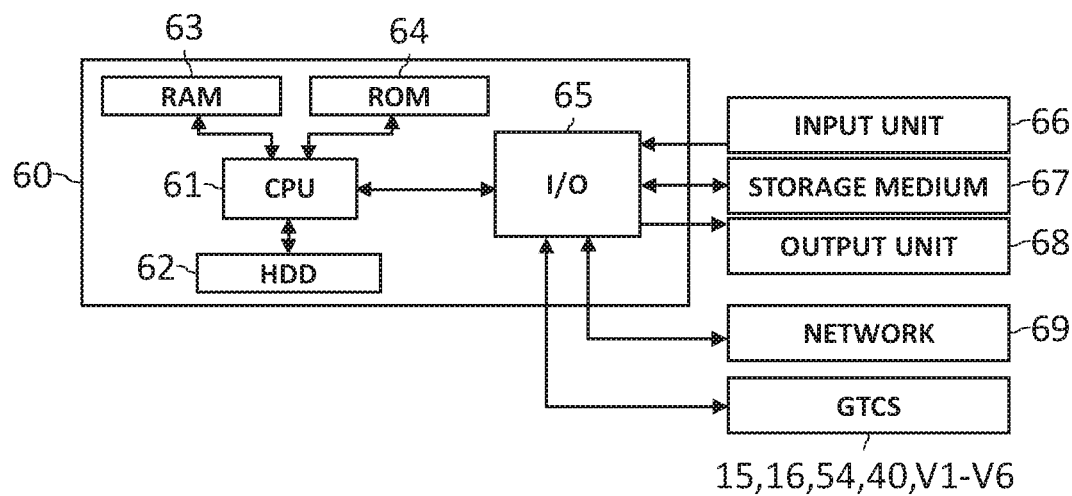
FIG. 6 is a conceptual diagram of a control device provided in the GTCS of FIG. 5.

FIG. 6 is a conceptual diagram of a control device provided in the GTCS of FIG. 5. In FIG. 6, same or corresponding elements as or to those in the first embodiment are denoted by the same reference characters as those in the drawings of the first embodiment. As depicted in FIG. 6, a detection signal of the gas detector 54 is input to the control device 60. The control device 60 generates a signal for outputting a detection result on the basis of the detection signal from the gas detector 54, in response to an operation signal input from the input unit 66 by, for example, operator's operation. The output unit 68 outputs the detection result of the gas detector 54 on the basis of the signal input from the control device 60. While an output form of the detection result is not limited, the detection result of the gas detector 54 can be displayed on the monitor that is the output unit 68 in real time in a case of assuming, for example, monitor display. While a concentration of each component of the gaseous fuel F or information as to whether the concentration exceeds a corresponding threshold may be displayed as the detection result of the gas detector 54, whether at least one type of target component has been detected may be displayed. In a case of notifying an operator whether the concentration of the target component is equal to or higher than the threshold or whether the target component has been detected, the loudspeaker serving as the output unit 68 may output a sound (output a warning sound or a message) without using the monitor display.

Other configurations and operations of the present embodiment are similar to those of the first embodiment. The present embodiment exhibits an advantage in that with the output unit 68 such as the monitor, the fact that there is no stagnation of the leaking fuel in the exhaust system of the HRSG 50 can be confirmed at the time of changing the operation using bypass stack to the operation using HRSG, in addition to a similar effect to that of the first embodiment.

Third Embodiment

Figure 7:
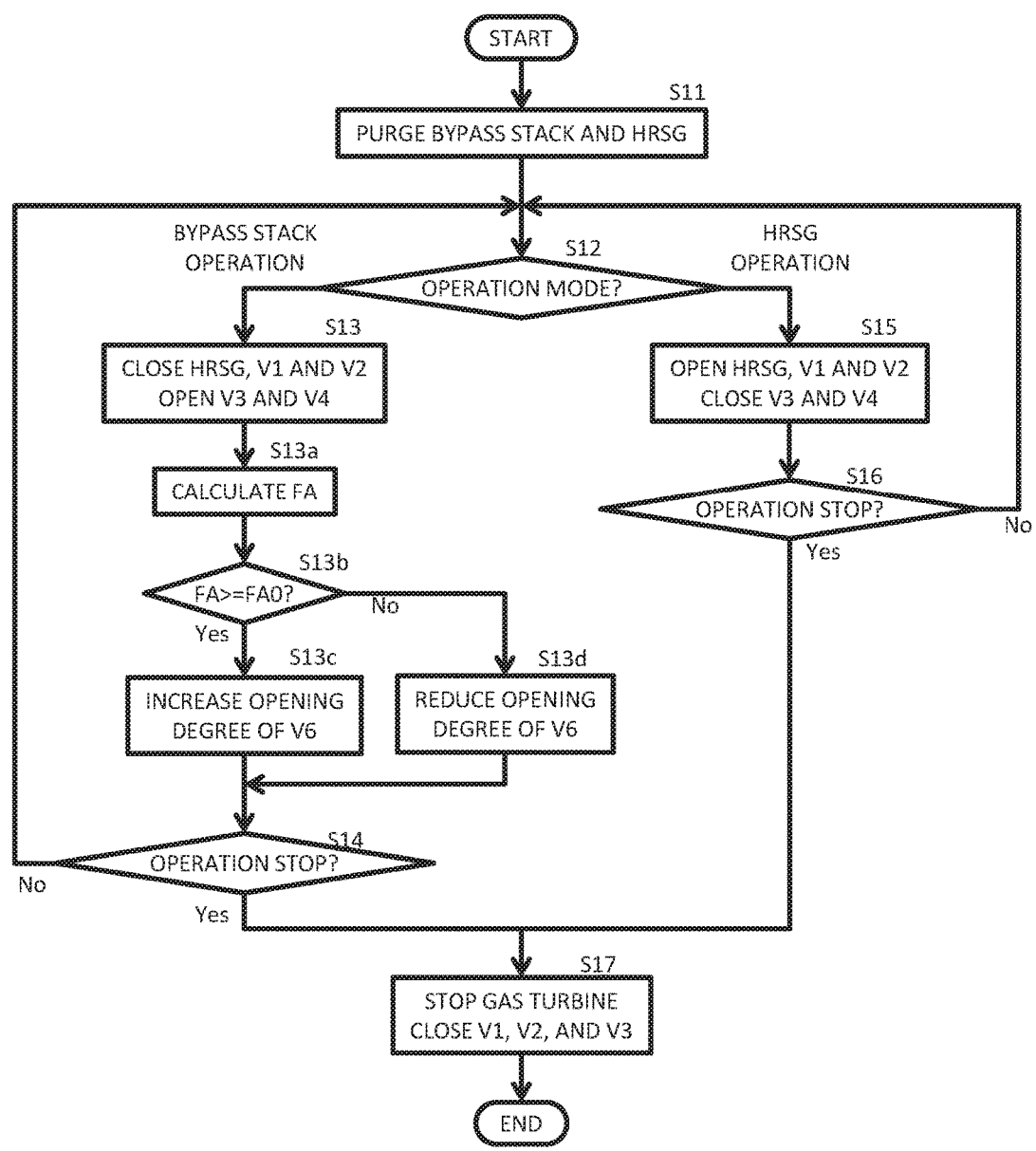
FIG. 7 is a flowchart representing principal parts of procedures for operation mode change by a control device of a GTCS according to a third embodiment of the present invention.

FIG. 7 is a flowchart representing principal parts of procedures for operation mode change by a control device of a GTCS according to a third embodiment of the present invention. A hardware configuration of the present embodiment is similar to that of the second embodiment. However, the gas detector 54 that can measure the concentration of each component of the gaseous fuel F is used. The preset threshold for each component of the gaseous fuel F in the duct burner fuel supply system 53 is stored in the memory. The components of the gaseous fuel F have different lowest auto-ignition temperatures and have different lowest auto-ignition concentrations. The threshold set for each component is a set value that is set lower than a value of the lowest concentration at which the corresponding component in the gaseous fuel F could be ignited by as much as a set margin. A threshold FA0 is set for a concentration FA of each component.

In addition, a procedure for calculating a gaseous fuel concentration during the operation using bypass stack (S13$a$), a procedure for determining the gaseous fuel concentration (S13$b$), and procedures for controlling the opening of the air flow control valve V6 (S13$c$ and S13$d$) are added to the GTCS operation program stored in the memory. The procedure for calculating the gaseous fuel concentration (S13$a$) is a procedure next to the procedure S13, and the control device 60 calculates the concentration FA of each of the components in the gaseous fuel on the basis of the detection signal of the gas detector 54. In the next procedure for determining the gaseous fuel concentration (S13$b$), the control device 60 determines whether there is a component in the gaseous fuel the concentration of which exceeds the corresponding threshold FA0 (FA≥FA0). In the subsequent procedure for controlling the opening of the air flow control valve V6, the control device 60 increases the opening of the air flow control valve V6 by a set value if it is determined in the procedure S13b that there is a component the concentration of which exceeds the threshold (S13c), and reduces the opening by a set value if there is no component the concentration of which exceeds the threshold (S13d). Upon executing the procedure S13c or S13d, the control device 60 goes to the procedure S14. The procedures S11 to S17 except for the procedures S13a to S13d are similar to those of the first embodiment.

The present embodiment can obtain a similar effect to that of the first embodiment by always opening the air supply shut-off valve V3 and the ventilation shut-off valve V4 during the operation using bypass stack. In addition, the present invention can obtain a similar effect to that of the second embodiment since the detection result of the gas detector 54 can be confirmed with the output unit 68.

It is desired that the GTCS has high energy efficiency since the GTCS is a generation system. It is preferable that a flow rate of the gas A supplied to the fuel line P1 during the operation using bypass stack is small from this viewpoint. In the present embodiment, controlling the air flow control valve V6 in response to the detection result of the gas detector 54 makes it possible to suppress the flow rate of the supplied air. Since it is supposed that leakage of the gaseous fuel F does not occur in the shut-off valves, the opening of the air flow control valve V6 is basically reduced to the minimum opening during the operation using bypass stack by control procedures of FIG. 7. In this case, since the flow rate of the supplied air is suppressed to the minimum flow rate, there is a probability that the gas detector 54 detects the leaking fuel the concentration of which exceeds the threshold in a case of occurrence of leakage of the gaseous fuel. In that case, however, the opening of the air flow control valve V6 is automatically increased to increase the flow rate of the supplied air; thus, the leaking fuel is promptly discharged via the ventilation piping P3. It is thereby possible to always prevent the stagnation of the leaking fuel in the exhaust system of the HRSG 50 similarly to the first and second embodiments and it is also possible to greatly suppress the flow rate of the supplied air. It is, therefore, possible to reduce energy required for the GTCS and expect improvement in energy efficiency.

What is claimed is:

1. A gas turbine cogeneration system comprising:
a gas turbine; a heat recovery steam generator, a bypass stack provided upstream of the heat recovery steam generator in a gas turbine exhaust gas path; a bypass damper that opens/closes the bypass stack; and a computer that controls the gas turbine, the heat recovery steam generator, and the bypass damper, wherein
the heat recovery steam generator includes:
a duct burner;
a main shut-off valve that is provided in a fuel line of the duct burner;
a fuel shut-off valve that is provided upstream of the main shut-off valve in the fuel line of the duct burner;
an air supply piping that joins the fuel line at a position upstream of the main shut-off valve and downstream of the fuel shut-off valve;
an air supply shut-off valve that is provided in the air supply piping;
a ventilation piping that is branched off from the fuel line at a position upstream of the main shut-off valve and downstream of the fuel shut-off valve; and
a ventilation shut-off valve that is provided in the ventilation piping, and
the computer is programed,
during an operation using the bypass stack, to close an inlet of the heat recovery steam generator to open the bypass stack, close the main shut-off valve and the fuel shut-off valve, and open the air supply shut-off valve and the ventilation shut-off valve, thereby always executing a purge of the fuel line by opening the air supply piping and the ventilation piping, and
at a time of changing to an operation using the heat recovery steam generator, to open the inlet of the heat recovery steam generator to close the bypass stack without shut down of the gas turbine, open the main shut-off valve and the fuel shut-off valve, and close the air supply shut-off valve and the ventilation shut-off valve.

2. The gas turbine cogeneration system according to claim 1, wherein
the number of each of the ventilation piping and the air supply piping is only one.

3. The gas turbine cogeneration system according to claim 1, comprising:
a gas detector that is provided in the heat recovery steam generator and that outputs a detection signal to the computer; and
an output unit that outputs a detection result of the gas detector on the basis of an output signal from the computer.

4. The gas turbine cogeneration system according to claim 1, comprising:
a gas detector that is provided in the heat recovery steam generator and that outputs a detection signal to the computer; and
an air flow control valve that is provided in the air supply piping, wherein
the computer is programed to increase an opening of the air flow control valve in a case in which a component of a gaseous fuel having a concentration equal to or higher than a set value is present and to reduce the opening of the air flow control valve in a case otherwise, on the basis of the detection signal of the gas detector during the operation using the bypass stack.

5. An operation mode change method for a gas turbine cogeneration system including: a gas turbine; a heat recovery steam generator, a bypass stack provided upstream of the heat recovery steam generator in a gas turbine exhaust gas path; and a bypass damper that opens/closes the bypass stack, wherein
the heat recovery steam generator includes:
a duct burner;
a main shut-off valve that is provided in a fuel line of the duct burner;
a fuel shut-off valve that is provided upstream of the main shut-off valve in the fuel line of the duct burner;
an air supply piping that joins the fuel line at a position upstream of the main shut-off valve and downstream of the fuel shut-off valve;
an air supply shut-off valve that is provided in the air supply piping;
a ventilation piping that is branched off from the fuel line at a position upstream of the main shut-off valve and downstream of the fuel shut-off valve; and a ventilation shut-off valve that is provided in the ventilation piping, the operation mode change method comprising steps of:

during an operation using the bypass stack, closing an inlet of the heat recovery steam generator to open the bypass stack, closing the main shut-off valve and the fuel shut-off valve, and opening the air supply shut-off valve and the ventilation shut-off valve, thereby always executing a purge between the main shut-off valve and the fuel shut-off valve of the fuel line with air by opening the air supply piping and the ventilation piping; and at a time of changing to an operation using the heat recovery steam generator, opening the inlet of the heat recovery steam generator to close the bypass stack without shutting down the gas turbine to close the bypass stack, and opening the main shut-off valve and the fuel shut-off valve.

\* \* \* \* \*